Patented Oct. 12, 1948

2,451,048

UNITED STATES PATENT OFFICE 2,451,048

LUBRICATING OIL ADDITION AGENTS

William J. Sparks, Cranford, N. J., and Donald C. Field, Baton Rouge, La., assignors to Standard Oil Development Company, a corporation of Delaware No Drawing. Application March 23, 1944, Serial No. 527,838

7 Claims. (Cl. 260—4)

This invention relates to the manufacture of new compositions of matter especially suitable as addition agents for mineral oil lubricating compositions, to improve the quality thereof, especially in regard to the viscosity temperature relationship, "oiliness" and reduction in pour point; and also to such lubricating composites as new compositions of matter. This application is a continuation in part of our co-pending application, Serial No. 248,908, filed December 31, 1938, now abandoned.

The prior art teaches the advantages of adding certain materials in small percentages to lubricating oils to improve such features as the viscosity index or pour point. The present invention relates to this field and more especially to a new lubricating oil composition produced by the addition to lubricating oil stocks of a small percentage of a single compound, whereby a high V. I. improvement may be coupled with a lowered pour point and also an improved "oiliness." The appearance of the oil to which the addition is made is not adversely affected.

The addition agents are rubber-unsaturated, carbon-hydrogen compounds apparently somewhat of the nature of cyclized rubber, prepared by an interaction between certain $C_4$ unsaturated hydrocarbons and a rubber material or the like, in solution in an inert medium, in the presence of a highly dispersed polymerizing agent in the fluidized state.

The rubber material may be any form of commercial, unvulcanized rubber, such as smoked sheet, pale crepe and reclaimed rubber which has been devulcanized, or it may be synthetic rubber-like material of unsaturation greater than 25% as measured by the Kemp method for natural rubber. Of this synthetic rubber-like material particularly suitable are the polybutadienes, polyisoprenes and the co-reaction products of the diolefins with the polymerizable monomers such as the acrylates, styrenes and acrylonitriles. Also, unvulcanized rubber material such as Hevea brasiliensis, Jelutong, Pontianak and the like may also be used. Furthermore, gutta percha and the like may be employed as the rubber material.

In general, therefore, the rubber material reactant is that which may advantageously be termed an elastomer. To be specific as to the meaning in this specification of the term "elastomer," designation is hereby made to such materials as are chemically unsaturated solid organic substances of substantially aliphatic linear chain structure in which there may be side chain substituents, the chemical unsaturation being interspersed along the length of the chain as double bonds and thus rendering the substance capable of reacting with sulfur to give a product which has an elongation under tension of from 200% to 1200% at break, a forcible retraction upon release of the tension to about the original dimension and shape and a tensile strength at break ranging between 500 lbs. and 5,000 lbs. per sq. in.

The elastomer, before use in the present invention, is preferably cold milled for about 15 minutes, that is, masticated on steel rolls to increase its solubility. The milled rubber is dissolved in an inert solvent, such as benzene, octane, aluminum chloride treated petroleum solvent oil, carbon tetrachloride, etc.

The second material is a $C_4$ unsaturated hydrocarbon capable of polymerization to form a polymer of at least 40,000 molecular weight. At the present time, only isobutylene and butadiene have been found to have such characteristic chemical reactivity.

While the proportion of elastomer to the $C_4$ unsaturated hydrocarbon may vary widely, suitable proportions in weight quantities have been found to be from 2 parts of rubber material to 1 part of the $C_4$ unsaturated compound to 1 part of rubber material to 10 or more parts of the $C_4$ compound.

The catalyst employed is preferably an amphoteric metal halide, such as stannic chloride or bromide, titanium tetrachloride, germanium tetrachloride, boron fluoride, aluminum chloride in solution (preferably in methyl chloride), and the like. The amount of catalyst employed may vary from 0.2% to 5% by weight of the rubber material and the $C_4$ unsaturated hydrocarbon in the reaction mixture.

The temperature of the reaction is generally between —20° C. and 40° C. The particular temperature employed depends largely on the individual reactants, and to a lesser extent on the solvent medium, but in general, the reaction occurs within the range specified, the upper temperature being determined by the temperature below which mineral oil insoluble products are obtained. Temperature likewise depends to some extent on the amount and nature of the catalyst. The time of reaction also varies considerably and is regulated so as to cause the reaction to proceed smoothly. For this reason particularly the temperature of reaction is normally above —20° C. since at temperatures below —20° C. the reaction time makes the operation unduly lengthy and inconvenient. The reaction is usually carried out in an atmosphere of air, but an atmosphere of nitrogen or some other inert gas may also be employed.

The preparation of the new substances is carried out by slowly adding the catalyst to the solution of the elastomer and at the same time gradually adding, where possible by vaporizing and bubbling through the solution, the $C_4$ unsaturated hydrocarbon at a temperature sufficiently low to prevent a violent reaction. The mixture is maintained below 40° C. by immersion, as necessary in an ice-bath and allowed to stand for sufficient time for the completion of the reaction. The resultant mixture is then either distilled to separate the unreacted constituents, or treated with alcohol, acetone, or such reagents to cause precipitation of the rubber-resin reaction product. The crude rubber resin, as separated, is dissolved in benzene and reprecipitated from this solution by alcohol. This procedure is repeated several times and the product is finally dried in a vacuum oven at 100° C.

To illustrate the present invention and to set forth its advantages, the following examples are presented:

EXAMPLE 1

60 gm. of pale crepe rubber was masticated for 15 minutes on a cold mill, and subsequently dissolved in 600 cc. of benzene. The resultant solution was placed in a 2 liter, 3 necked flask and cooled in an ice-bath. The flask was fitted with a dropping funnel containing 100 cc. of titanium tetrachloride, a motor-driven stirring paddle, and with inlet and outlet gas tubes. The titanium tetrachloride and 200 cc. (liquid volume) of isobutylene were added simultaneously at 10° C. very slowly to the rubber solution. The reaction mixture was vigorously agitated during the reaction and subsequently less vigorously agitated for about 24 hours. After this time the reaction mixture was treated with alcohol or acetone, the precipitate so formed separated by filtration, and the product (the precipitate) obtained was dried in a vacuum oven at 100° C. The dried material was dissolved in fresh benzene, the solution treated with alcohol, and the precipitate (the product) so formed, dried in a vacuum oven at 100° C.

The rubber resin so obtained was a plastic solid, varying in color from white to brown, and in consistency from a soft rubbery solid to a harder solid. When 2% of the material was dissolved in a lubricating oil stock the following results were obtained:

|  | Blank | With 2% resin |
|---|---|---|
| Vis. at 100° F. (Say. Univ.) | 151.8 | 190.3 |
| Vis. at 210° F. (Say. Univ.) | 44.0 | 47.6 |
| V. I. | 112 | 120 |
| Pour Point, ° F. | 0 | −20 |
| Conradson Carbon | .001 | .001 |
| S. D. Sligh | 17.1 | 22.7 |
| Oxidation Life Test (in hours) [1] | 120 | 78 |
| Color | 19¾ | 17 |
| Gravity, ° A. P. I. | 33.7 | 33.3 |

[1] In this test 10 litres of air are passed per hour over a 300 cc. sample of the oil heated at 341° F. After 24 hours, and each subsequent 24 hours, 5 gram samples are taken, and the naphtha insoluble sludge determined. When the total naphtha insoluble sludge has reached 20 mg., the test is discontinued. The life of the oil is taken as the number of hours necessary to obtain 10 mg. of sludge per 10 grams of oil in the particular sample.

EXAMPLE 2

30 grams of milled crepe rubber was dissolved in 300 cc. of aluminum chloride treated solvent oil, 100 cc. of liquid isobutylene and 100 cc. of titanium chloride were added, the latter as a catalyst. The reaction was carried out at 10° C. An elemental analysis of the product gave carbon 83.94%, hydrogen 12.45%, ash 2.21%, and impurities 1.40%. From the weight percentages of carbon and hydrogen in the product and from the weight percentages of carbon and hydrogen in isobutylene, and the rubber material, the percentage of reacted isobutylene in the product was calculated as 47.6.

In order to demonstrate more effectively the pour point depressant and the viscosity improving properties of the product, several lubricating oils were employed.

In testing the pour point depressing quality of the product, the standard pour point reference oil, having an original pour point of 30° F. and designated as "Oil A" for identification was employed. The oil containing 2% by weight of the above product was found to have a pour point of −25° F. Similarly, the viscosity improving characteristics of the product were tested by blending the product with three oils, designated here for identification as oils "B," "C," and "D." The results obtained were as follows:

*Viscosity temperature data*

| Oil | Vis. in Say. Univ. Specs. | | V. I. |
|---|---|---|---|
|  | 100° F. | 210° F. |  |
| Oil "B"—blank | 155.4 | 43.3 | 94 |
| Oil "B"+2% Product Ex. 1 | 201.9 | 47.1 | 105 |
| Oil "C"—blank | 102.0 | 37.7 | 18 |
| Oil "C"+2% Product Ex. 1 | 161.4 | 42.7 | 69 |
| Oil "D"—blank | 275.8 | 45.9 | 13 |
| Oil "D"+2% Product Ex. 1 | 385.3 | 51.6 | 47 |

EXAMPLE 3

To 40 gm. of rubber dissolved in 2000 cc. of benzene, 50 cc. of stannic chloride was added and 160 cc. of isobutylene was passed into the mixture at room temperature (20° C.).

The product obtained was estimated to contain 13.4% reacted isobutylene. When added to the oil "A" in an amount of 2% by weight, the pour point obtained was −20° F.

| Oil | Vis. in Say. Univ. Secs. | | V. I. |
|---|---|---|---|
|  | 100° F. | 210° F. |  |
| Oil "B"+2% product Ex. 3 | 219 | 48.4 | 107 |
| Oil "D"+2% product Ex. 3 | 354 | 50.4 | 47 |

EXAMPLE 4

The same physical steps and apparatus were employed as described in Example 1. 60 gm. of crepe rubber was dissolved in 800 cc. of xylene, 100 cc. of stannic chloride was added slowly and 600 cc. of liquid isobutylene was vaporized and bubbled through the mixture simultaneously with the addition of the catalyst. The reaction mixture was maintained at room temperature (20° C.).

The product obtained in this case was calculated from the carbon and hydrogen analyses to have a content of 15.5% reacted isobutylene. The product when added to oil "A" in quantity 2% by weight, the pour point of the composite was −25° F.

| Oil | Vis. in Say. Univ. Secs. | | V. I. |
|---|---|---|---|
| | 100° F. | 210° F. | |
| Oil "B"—blank | 155.4 | 43.3 | 94 |
| Oil "B"+2% Product Ex. 4 | 194.3 | 46.6 | 105 |
| Oil "C"—blank | 102 | 37.7 | 18 |
| Oil "C"+2% Product Ex. 4 | 132.2 | 40.6 | 53 |

EXAMPLE 5

The same physical steps and apparatus were employed as in Example 1. To 20 gm. of milled rubber dissolved in 800 cc. of benzene, 0.2 gm. of boron fluoride and 150 cc. of isobutylene were bubbled through the mixture at room temperature. The product was estimated to contain 11.0% reacted isobutylene. When added to the oil "A" in an amount 2% by weight, the pour point obtained was −30° F.

| Oil | Vis. in Say. Univ. Secs. | | V. I. |
|---|---|---|---|
| | 100° F. | 210° F. | |
| Oil "B"+2% Product Ex. 5 | 210 | 48.0 | 109 |
| Oil "D"+2% Product Ex. 5 | 378 | 52 | 53 |

EXAMPLE 6

The same physical steps and apparatus were employed as in Example 1. To 40 gm. of milled rubber dissolved in 800 cc. of benzene, 100 cc. of stannic chloride was added, and 50 gm. of butadiene passed in at room temperature.

The product was estimated to contain 27% reacted butadiene. The product was soluble in benzene and mineral oils. When added to oil "A" the pour point obtained was −15° F.

| Oil | Vis. in Say. Univ. Secs. | | V. I. |
|---|---|---|---|
| | 100° F. | 210° F. | |
| Oil "B"+2% Product Ex. 6 | 241 | 50.7 | 116 |
| Oil "D"+2% Product Ex. 6 | 432 | 55.2 | 65 |

The following test results are presented to demonstrate the effect of reactions of temperatures about 40° C. The same physical steps and apparatus were employed as in Example 1. Through 30 gm. of milled rubber dissolved in 300 cc. of octane, 0.2 gm. of boron fluoride and 170 cc. of isobutylene were bubbled. The temperature was allowed to increase up to about 60° C. and the processing was then discontinued. The reaction product was treated with alcohol and the precipitate so obtained was dried. Elemental analysis established $C=80.59\%$, $H=10.60\%$ and ash 0.622%. The product was insoluble in octane, xylene and mineral lubricating oils.

As is well known, butadiene polymerization reactions are even more difficult to control. For this reason operations to prepare oil-soluble polymers above 40° C. would not be at all feasible.

The materials prepared according to the above examples have uses in plastics, rubber-compounding, coatings, varnishes and water-proofing. The material may be chlorinated or oxidized to produce plasticizers.

The present invention is not limited to any theory of the mechanism of the reaction, nor to any reasons for the improvements brought about by the addition of the rubber resin compound to the mineral lubricating oil.

What is claimed is:

1. The process for preparing a compound soluble in hydrocarbon oil which comprises reacting one part of an unsaturated high molecular weight essentially hydrocarbon polymeric material having an unsaturation greater than 25% as measured by the Kemp method for natural rubber and characterized by having a substantially aliphatic linear chain structure with the unsaturation interspersed along the chain as double bonds and by being capable of reacting with sulfur to give a product which has an elongation under tension of from 200% to 1200% at break, a forcible retraction upon release of the tension to the original dimension and shape and a tensile strength at break ranging between 500 lbs. and 5000 lbs. per sq. in., with 0.5 to 10 parts of a $C_4$ unsaturated hydrocarbon selected from the group consisting of isobutylene and butadiene, at a temperature between −20° C. and 40° C. in the presence of 0.2% to 5% by weight, based on the total reacting material, of an amphoteric metal halide polymerization catalyst in a highly dispersed fluid state.

2. A process according to claim 1 in which the polymerization catalyst is titanium tetrachloride.

3. A process according to claim 1 in which the polymerization catalyst is stannic chloride.

4. A process according to claim 1 in which the high molecular weight polymeric material is natural rubber.

5. The process for preparing a compound soluble in hydrocarbon oil which comprises reacting one part by weight of natural rubber with 2 parts by weight of isobutylene in benzene solution in the presence of 3 parts by weight of titanium tetrachloride at a temperature of about 10° C.

6. The process according to claim 1 in which the $C_4$ unsaturated hydrocarbon is isobutylene.

7. The process according to claim 1 in which the $C_4$ unsaturated hydrocarbon is butadiene.

WILLIAM J. SPARKS.
DONALD C. FIELD.

REFERENCES CITED

The following references are of record in the file of this patent:

UNITED STATES PATENTS

| Number | Name | Date |
|---|---|---|
| 1,178,721 | Hofmann et al. | Apr. 11, 1916 |
| 1,910,847 | Maximoff | May 23, 1933 |
| 2,142,220 | Steffen | Jan. 3, 1939 |
| 2,180,082 | Cunradi et al. | Nov. 14, 1939 |
| 2,213,423 | Weizevich | Sept. 3, 1940 |
| 2,420,558 | Munday | May 13, 1947 |

OTHER REFERENCES

Fisher, pages 941–945, August 1939, Ind. & Eng. Chem.